United States Patent [19]
Sato

[11] 4,073,451
[45] Feb. 14, 1978

[54] TAPE CASSETTE

[75] Inventor: Masaaki Sato, Hachioji, Japan

[73] Assignee: Olympus Optical Co., Ltd., Tokyo, Japan

[21] Appl. No.: 768,854

[22] Filed: Feb. 15, 1977

Related U.S. Application Data

[63] Continuation-in-part of Ser. No. 577,903, May 15, 1975, abandoned.

[30] Foreign Application Priority Data

Jan. 6, 1975 Japan .................................. 50-4324

[51] Int. Cl.² ...................... B65H 59/38; G03B 1/02; G11B 15/13; G11B 15/32
[52] U.S. Cl. .................................. 242/191; 242/199; 360/96
[58] Field of Search ........................ 242/186, 187–191, 242/192, 197–200, 208–210; 352/72, 78 R; 360/93, 96, 132, 74

[56] References Cited

U.S. PATENT DOCUMENTS

| | | | |
|---|---|---|---|
| 2,804,508 | 8/1957 | Mästling et al. | 242/192 X |
| 2,912,179 | 11/1959 | Schuyter | 242/200 |
| 3,610,552 | 10/1971 | Shirakura | 242/199 |
| 3,946,436 | 3/1976 | Takashino | 360/74 |
| 3,973,743 | 8/1976 | Suzuki | 242/186 |
| 4,010,918 | 3/1977 | Kato | 242/191 |

*Primary Examiner*—Leonard D. Christian
*Attorney, Agent, or Firm*—Ostrolenk, Faber, Gerb & Soffen

[57] ABSTRACT

A tape cassette includes a pair of tape hubs to which the opposite ends of a magnetic tape are secured. The tape running is conventional in that the magnetic tape wound on one of the tape hubs is taken upon on the other tape hub. The pair of apertures for receiving the tape hubs are formed as elongated elliptical slots. When the tape cassette is loaded in a tape recorder and a tape winding operation has proceeded until its one end is reached, the tension applied to the tape by the winding effort of the take-up hub shaft causes a displacement of the tape hub within its associated aperture, thereby permitting the end of tape to be detected for automatically stopping the tape recorder by either electrically or mechanically rendering the operating mechanism of the recorder inoperative. Alternatively, the end of tape detection may be utilized to activate an end of tape alarm.

18 Claims, 11 Drawing Figures

TAPE CASSETTE

BACKGROUND OF THE INVENTION

This application is a continuation-in-part of U.S. application Ser. No. 577,903 filed May 15, 1975 and now abandoned.

The invention relates to a tape cassette, and more particularly to a tape cassette used in a cassette tape recorder and also to an automatic stopping device for the recorder which uses such tape cassette.

As is well recognized, a conventional tape cassette includes a pair of tape hubs rotatably disposed at laterally offset positions from the center thereof, and a magnetic tape has its opposite ends secured to the respective hubs so that the tape wound on one of the tape hubs can be taken up on the other. Of widespread use is a type of such cassette which is commonly known as a compact cassette. When such a tape cassette is loaded into a tape recorder, it is loaded in the manner as illustrated in FIG. 1. Specifically, the cassette 1 is disposed in an oblique position for insertion into a cassette mount 2 of the recorder, and subsequently fitting openings 3a in tape hubs 3 of the cassette 1 are engaged with hub shafts 4 disposed on the cassette mount 2, and a positioning hole 1a of the cassette 1 is engaged with a positioning pin 5 on the cassette mount 2, thereby placing the cassette 1 on the mounting plate 2a to complete the cassette loading. Subsequent to the engagement of the hub shafts with the fitting openings 3a of the tape hubs 3, a rotation of the hub shaft 4 causes the hubs 3 to rotate as a result of engagement between projections 4a of the shaft and internal projections 3c extending from the wall of the fitting opening 3a.

In this manner, each tape hub 3 comprises a hollow cylindrical body of a short axial length which is centrally formed with the fitting opening 3a. In the outer peripheral region, the tape hub 3 has an increased thickness which is substantially equal to the width of a magnetic tape 6 that is to be wound thereon. As a result, a pair of circular recesses 3b are formed in both its upper and lower surfaces, into which inwardly extending tabs 1c of the cassette 1 which form apertures 1b for receiving the hub shafts extend, thereby rotatably holding the tape hubs 3 within the cassette 1. The tape hub 3 is dimensioned to have a predetermined amount of play with respect to the aperture 1b. Thus, the circular recesses 3b of the hubs 3 have a diameter which is greater than that of the apertures 1b so that the hub 3 is normally free to move to a certain extent. The purpose of providing play in this manner is to facilitate loading the cassette 1 into the cassette mount 2, since the engagement between the hub shaft 4 and the fitting opening 3a can be facilitated by allowing the fitting opening 3a to be displaced to a limited extent. It will be readily appreciated that the amount of such play can be reduced as the angular extent through which the cassette is rotated from the oblique position to the loaded position flat on the mounting plate 2a is reduced.

However, as the size of the cassette is reduced, the angle of inclination which the cassette assumes when loading it into the cassette amount increases, resulting in an increased value of the angular extend mentioned above to render it difficult to load the cassette in place if the play of the hub is maintained at the same value as before. Such difficultly can be overcome by increasing the play, which is, in turn, achieved by increasing the diameter of the circular recesses 3b in the tape hubs 3, However, the spacing between the pair of tape hubs will then be variable to a greater extent, which, in turn, presents difficulty in engaging the fitting openings with the hub shafts. Therefore, there is a need for a tape cassette which is compact and still permits a smooth loading operation.

On the other hand, there have been various automatic stopping devices proposed for use with tape recorders using a cassette tape. An automatic stopping device can be constructed by providing mechanical, electrical or optical means which detects the end of the magnetic tape contained within the cassette for turning off the power source of the tape recorder. However, even if the electrical circuit is deenergized, mechanical parts such as a pinch roller or drive transmitting idler remain in their operative positions when deactuated. If they are allowed to remain in these positions, pinch rollers and idlers, which have a rubber lining for frictional engagement, continue to be urged against other mating members, causing a permanent deformation of the rubber lining, which, in turn, result in wow, flutter and the like, which serve to degrade the signal to noise ratio.

To overcome such disadvantages, conventional automatic stopping devices incorporate an electromagnetic element such as a solenoid plunger so that the driving parts can be returned to their orginal or inoperative positions simultaneously with turning off of the power source. The electromagnetic element is operated by means which include:

i. a commutator connected with or assembled with the driving hub shaft for the tape hub and associated with a brush for emitting a pulse signal in the manner of a rotary switch, so that the electromagnetic element is operated when the pulse signal is removed;

ii. a rotary cam connected with the driving hub shaft or a tape counter for opening and closing a switch which produces a pulse signal, the electromagnetic element being operated when the pulse signal is removed;

iii. a rotary shutter mounted on the driving hub shaft of a tape counter for intermittently interrupting the light path between a light source and a light receiving element so as to produce a pulse signal, the electromagnetic element being operated when the signal is removed; and iv. a magnet connected with the driving hub shaft for rotation therewith so that a switch can be magnetically opened and closed to produce a pulse signal, the electromagnetic element being operated when the signal is removed.

In any of these arrangements, a pulse signal is produced during the operation of the tape recorder and the removal of the pulse signal at the end of the tape is utilized to energize the electromagnetic element such as a solenoid plunger in order to return the drive mechanism portions to their original positions. However, the pulse producing means for operating the electromagnetic element which returns the drive mechanism to the original position is both bulky and expensive, and though they may be applied in a sophisticated tape deck of a larger size, they do not lend themselves for use in a conventional cassette tape recorder, in particular to a tape recorder of a smaller size using a miniaturized cassette tape.

In an alternative arrangement, a tape recorder is automatically stopped by detecting a change in the tension acting on the tape which occurs at the end of the tape where it is secured to the tape hub. However, the detection of the tape end is difficult because of the small change in the tension applied, preventing an operational reliability and involving a troublesome adjustment. As a further alternative, a flywheel may be used to amplify the change in the tension, but this also adds to the complexity of the mechanism and still cannot assure an operational reliability over a prolonged period of time.

SUMMARY OF THE INVENTION

It is an object of the invention to provide a tape cassette, in particular of a small and miniature size, in which the apertures for receiving the tape hubs of the cassette are formed as elongated slots for greatly facilitating the loading of the cassette into a tape recorder.

It is a second object of the invention to provide an automatic stopping device for a cassette tape recorder which returns the drive mechanism portions to their original positions either electrically or mechanically by detecting a displacement of the tape hubs within their associated elongated apertures which occur as a result of the tension applied to the tape by the winding effort of the driving hub shaft when a tape winding operation has proceeded to one end of the tape.

It is a third object of the invention to employ the tape hub and cassette aperture design described above providing an alarm indication of the end of tape.

In accordance with the invention, a pair of apertures for receiving the tape hubs are formed as elongated slots for allowing the hubs to move along the slots when loading the tape cassette into a tape recorder, thus permitting the loading of the tape cassette to be achieved in a smooth and rapid manner while avoiding the likelihood of damage to the tape. In addition, when a tape winding operation has proceeded to one end thereof, a displacement of the tape hub takes place to a pronounced degree, whereby the detection of the tape end is greatly facilitated. The detection of the displacement may utilize a mechanical advantage so that the displacement can be magnified, thereby assuring a reliable stopping operation of the tape recorder. Both the detection and stopping mechanisms can be constructed as a simple and non-bulky structure, so that they lend themselves to adaptation with a recorder which utilizes a miniature tape cassette. In this manner, the invention enables an automatic stopping function to be incorporated into a tape recorder which utilizes a miniature tape cassette, even though such incorporation has been considered as impossible in the prior art.

BRIEF DESCRIPTION OF THE DRAWINGS

FIGS. 7a and 7b show portions of the tape end detection apparatus of FIG. 7 in cooperation with alarm devices for indicating an end of tape detection;

DETAILED DESCRIPTION OF PREFERRED EMBODIMENTS

Figure 2:
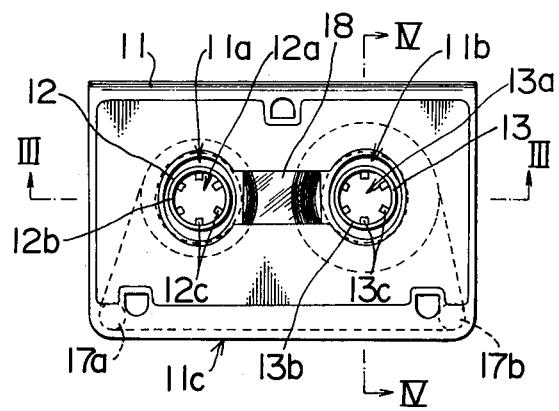
FIG. 2 is an enlarged plan view of the tape cassette constructed according to one embodiment of the invention.

FIG. 2 is a plan view of a miniature tape cassette 11 to which the invention is applied. The cassette 11 has a size comparable to that of a small packet of matches, and is formed with a pair of laterally spaced apertures 11a, 11b for receiving tape hubs generally in the same manner as in a conventional compact cassette. The apertures 11a, 11b are in the form of elongated slots which are elliptical in configuration and having their major axis extending parallel to the short side of the cassette 11. A pair of tape hubs 12, 13 are rotatably held within the apertures 11a, and 11b in the manner to be described later.

Figure 3:
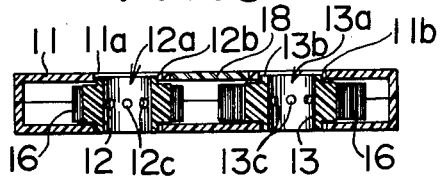
FIG. 3 is a cross section taken along the line III—III shown in FIG. 2.
Figure 4:
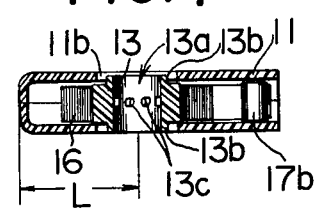
FIG. 4 is a cross section taken along the line IV—IV shown in FIG. 2.

The tape hubs 12, 13 are in the form of cylindrical bodies having a short axial length and in which fitting openings 12a, 13a for engagement with the hub shafts 14 (see FIGS. 5 and 6) are formed. Along the periphery of the fitting openings, each of the hubs is formed with a pair of upper and lower annular ribs 12b, 13b which are fitted into the apertures 11a, 11b, as shown in FIGS. 3 and 4, whereby the tape hubs 12, 13 are rotatably supported within the cassette 11. The diameter of the apertures 11a, 11b as measured along their minor axes corresponds to the outer diameter of the ribs 12b, 13b. As a consequence, the play of the tape hubs 12, 13 relative to the apertures 11a, 11b is small in a direction parallel to the long side of the cassette 11, but is greater in a direction parallel to the short side thereof. Thus, the tape hubs 12, 13 can be displaced to a greater degree in a direction parallel to the short side of the cassette 11.

A magnetic tape 16 has its opposite ends secured to the tape hubs 12, 13 in the same manner as in a conventional compact cassette. Specifically, the tape extending from one tape hub 12 is passed around guide rollers 17a, 17b so as to extend along the front surface 11c of the cassette 11 before being taken up on the other tape hub 13.

A plurality of projections 12c, 13c extend inwardly from the respective hubs 12, 13 into the fitting openings 12a, 13a, respectively, and when the fitting openings 12a, 13a are engaged with the pair of hub shafts 14, these projections engage with projections 14a on the hub shafts (see FIGS. 5 and 6) for rotating the tape hubs 12, 13 in the conventional manner. The front surface 11c is formed with a plurality of windows (not shown) into which magnetic heads and at least one pinch roller move for contact with the magnetic tape as in the conventional tape cassette. In addition, the tape cassette 11 is also formed with a capstan insertion hole and a positioning hole as well as a window 18 intermediate the both hubs 12, 13 which serves for ascertaining the running of the tape.

Figure 1:
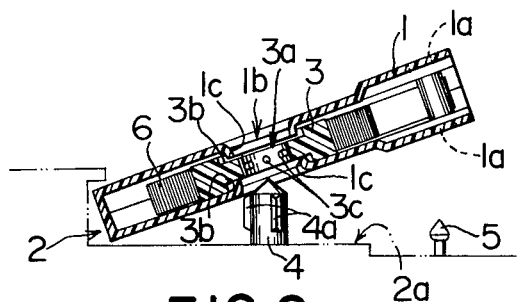
FIG. 1 is a cross section of a conventional tape cassette, showing a loading operation thereof.
Figure 5:
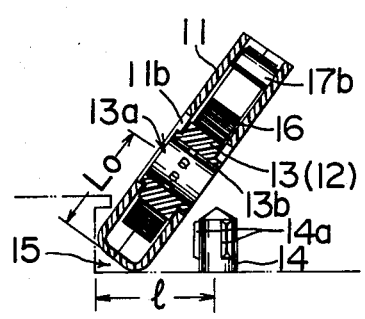
FIGS. 5 and 6 are cross sections of the cassette showing the manner of loading the tape cassette according to the invention.
Figure 6:
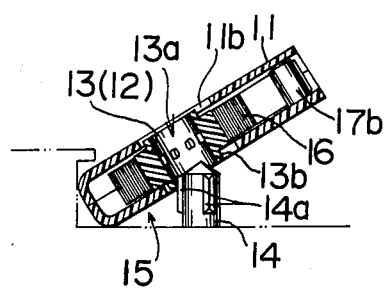

With the tape cassette 11 according to the invention, the ellipitcal elongated slots or apertures 12, 13 permit the tape hubs 12, 13 to move lengthwise thereof when loading the cassette 11 in an oblique position into the cassette mount 15, as shown in FIG. 5, thus assuring a rapid engagement of the fitting openings 12a, 13a with the hub shafts 14. By contrast, when a miniature cassette is inserted into the cassette mount 15 in the similar manner as with a conventional compact cassette 1 (see FIG. 1) by initially disposing it in an oblique position, a reduced distance L (see FIG. 4) between the fitting opening and the rear surface of the cassette will result in a reduced distance between the rear wall of the cassette mount 15 and the hub shafts 14. As a consequence, the cassette must be inserted with an increased angle of inclination during its loading. Therefore, the degree of freedom permitted for the movement of the tape hubs in a conventional tape cassette is insufficient to assure a ready engagement of the hub shafts 14 with the fitting openings such as shown at 12a, 13a. In this respect, it will be noted that the elongated formation of the apertures 11a, 11b in accordance with the invention permits the distance L to be reduced to a smaller distance $L_0$ by allowing the hubs 12, 13 to move to the rear of the cassette 11, whereby the engagement with the hub shafts 14 is greatly facilitated. Subsequent to the initiation of the engagement between the tape hubs 12, 13 and the hub shafts 14, as the cassette 11 is gradually lowered as shown in FIG. 6, the fitting openings 12a, 13a in the hubs 12, 13 become increasingly aligned with the hub shafts, and accordingly the tape hubs 12, 13 move toward the center of the apertures 11a, 11b. When the fitting openings are completely engaged with the hub shafts, the hubs 12, 13 assume a central position within the respective apertures 11a, 11b. In this manner, the loading operation of the cassette is greatly simplified in accordance with the invention. The loading can be further facilitated by rounding the rear portion of the cassette which bears against the rear wall of the cassette mount 15 in the tape recorder. Alternatively, a resilient member such as a leaf spring may be interposed in front of the rear wall of the cassette mount for aiding in further facilitating the loading operation.

It is to be noted that the formation of the elongated slots does not result in an increase in the size of the tape hubs. If the apertures for receiving the hubs are enlarged while maintaining their circular shape, there will be created a possibility that the tape hubs may be displaced or removed therefrom. This would require an increased diameter for the tape hubs. By contrast, with the elongated slots formed in accordance with the invention, the tape hubs can be securely retained in place by the reduced diameter portions thereof without increasing the size of the hubs, thus maintaining the same tape winding capacity. The tape hubs may have an outer diameter which is slightly greater than the portions of the elliptical apertures which have the minimum diameter. In other words, the outer diameter of the hubs must be reduced so as to be less than the diameter of the apertures as measured along their major axis, but only need be less than the diameter measured along the minor axis thereof. As a consequence, the outer diameter of the hubs can even be reduced as compared with that of the conventional tape hubs, thereby affording the possibility of increasing the tape winding capacity.

Since the upper and lower end faces of the tape hubs 12, 13 of the tape cassette 11 according to the invention are only slightly recessed relative to the upper and lower surfaces of the cassette, these end faces can be readily viewed from the exterior, thus enabling the tape running to be confirmed by an observation of the rotation of the end faces.

Figure 7:
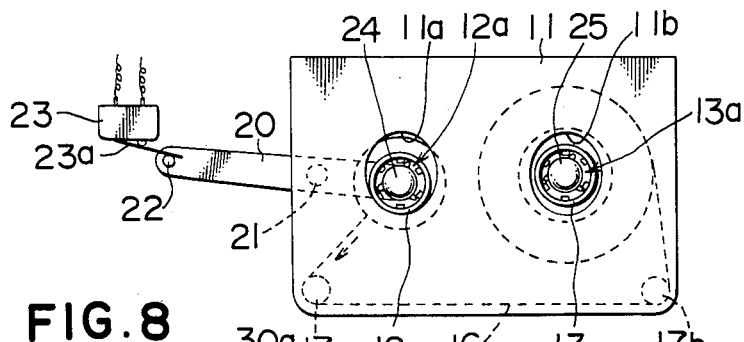
FIG. 7 is a plan view of the automatic stopping device for the tape recorder constructed according to one embodiment of the invention.

FIG. 7 shows the automatic stopping device of a tape recorder incorporating the tape cassette 11 mentioned above which is constructed in accordance with one embodiment of the invention. The automatic stopping device of the invention comprises a first mechanism for detecting a tape end mechanically when a tape winding operation has proceeded to one of its end, and a second, automatic stopping mechanism responsive to the first mechanism for returning the mechanical parts of the tape recorder to the original, inoperative positions. Referring to FIG. 7, the detection mechanism includes a detection lever 20 which is pivotally mounted at 21 on a stationary member of the tape recorder, and carries one of the hub shafts, 24, at its one end which is associated with a supply hub, and also carries a detector at its other end. The hub shaft 24 is adapted to engage the fitting opening 12a in one hub 12 of the tape cassette 11 so as to rotate integrally therewith as the tape 16 is fed, and constitutes a pair of tape drive shafts together with another hub shaft or take-up shaft 25 which is adapted to engage the fitting opening 13a in the other tape hub 23. The detector on the opposite end of the lever 20 comprises a pin 22 fixedly mounted thereon and merely abutting against an actuator 23a of a microswitch 23 which is disposed adjacent to the other end of the lever 20. The microswitch 23 is connected in series in a circuit interconnecting a power source +V with a solenoid plunger assembly 61 which serves by mechanical connection of its plunger with slide plate 33 of FIG. 8, for example, to return the mechanical parts of the tape recorder to their inoperative positions. The second or automatic stopping mechanism in the embodiment of FIG. 7 comprises conventional electrical means incorporating a solenoid plunger for opening the electrical circuit powering the tape motor, and therefore will not be described in detail herein.

FIG. 7a shows the arrangement of FIG. 7 employed with circuitry utilized for the purpose of providing either a visual or audible alarm, or both, for indicating the detection of a tape end.

As shown therein, the left-hand lead of microswitch 23 is attached to a voltage source +V, while the opposite lead is electrically connected to an alarm means 62 which, in turn, is connected to the opposite polarity of the voltage source or, as shown in FIG. 7a, to ground.

The operation of the circuitry of FIG. 7 is as follows:

When the magnetic tape 16 wound upon hub 12 is taken up by the other hub 13 and the end of tape 16 is reached, the winding effort of the take-up hub shaft 25 exerts tension in the tape which causes the tape hub 12 of the supply side to be displaced in the downward direction within its associated aperture 11a. The displacement of hub 12 accompanies the displacement of hub shaft 24 supporting hub 12 thereby rocking lever 20 clockwise about its pivot 21 causing pin 22 to exert an upward force against microswitch arm 23a of the microswitch and hence closing microswitch 23. This established an electrical path from voltage +V through the now closed microswitch 23 and the alarm A to ground potential causing the alarm to be energized. The alarm may be a lamp or may be a sound generating device. In the event that the alarm is a lamp, a panel preferably labelled with the words "tape end" will be caused to be illuminated to provide a visually observable indication of the fact that a tape end condition has been detected. In the event that it is desired that the alarm be in the form of an audible signal, the alarm, as shown in FIG. 7b may be comprised of a multivibrator or oscillator designed to generate a frequency within the audible range and having its output connected to the speaker of the recorder for the purpose of creating an audible sound of a predetermined frequency which is identified as an indication that a tape end has been detected. If desired, both the audible alarm and visual alarm may be connected in series with microswitch 23 to provide both an audible and visual indication of a tape end detection. In addition thereto, either the audible alarm or the visually observable alarm, or both, may be connected in series with the solenoid of FIG. 7 so as to simultaneously provide an indication of a tape end (either audible, or visual, or both) as well as performing an automatic stopping operation whereby the solenoid may, for example, be utilized to have its actuated armature impart a force against pin 49 of FIG. 8, for example, to collapse the linkages 46 and 47 from the position shown in FIG. 8 to the position shown in FIG. 9 so as to move plate 33 downwardly under the control of springs 48b and 48a so as to displace the magnetic head 38 from tape 16 and to simultaneously move pinch roller 39 away from capstan 44.

With the automatic stopping device thus constructed, when the magnetic tape 16 wound on the hub 12 is taken up by the other hub 13 and the end of tape 16 is reached, the winding effort of the take-up hub shaft 25 exerts tension in the tape which causes the tape hub 12 of the supply side to be displaced substantially in a downward direction, as viewed in FIG. 7, within its associated aperture 11a. This displacement of the hub 12 accompanies a displacement of the hub shaft 24 also, thereby rocking the lever 20 clockwise about the pivot 21 so as to close the microswitch 23 with the pin 22. Thereupon, the solenoid plunger is energized to operate the automatic stopping mechanism which is then operative to return the mechanical parts of the tape recorder to their inoperative positions in a reliable manner.

Figure 8:
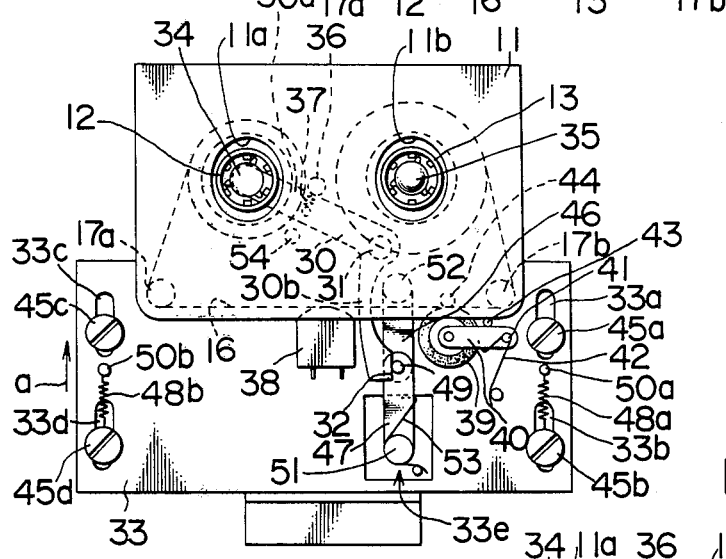
FIG. 8 is a plan view of another embodiment of the automatic stopping device.
Figure 9:
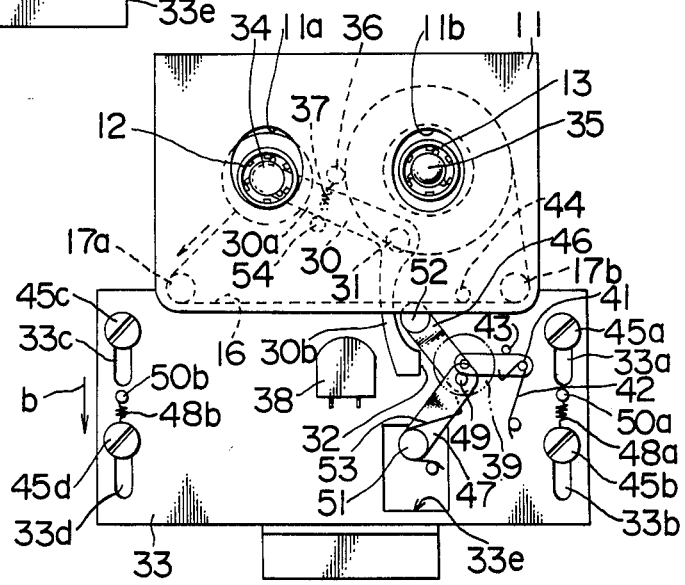
FIG. 9 is a view similar to FIG. 8, illustrating the operation of the automatic stopping device.

As a further alternative, the visually observable alarm may be a window W provided in the recorder housing and cooperating with indicia on slide plate 33 which indicia may be selectively moved into view within the window to display the condition. As shown in FIGS. 8 and 9 when the tape is running normally, the indicia is displaced from the window W. When the tape end condition occurs, slide plate 33 is moved downwardly from the position of FIG. 8 to the position of FIG. 9 to move the indicia ("END OF TAPE") into view within window W. The indicia may be words or a color (red, for example). The display may be activated either by the mechanical means of FIGS. 8 and 9 or the solenoid of FIG. 7.

FIGS. 8 and 9 show another embodiment of the automatic stopping device of the tape recorder according to the invention which incorporates a mechanical version of the automatic stopping mechanism. In this embodiment, there is provided a detection lever 30 which is substantially in the form of an inverted L in configuration and which is pivotally mounted at 31 on a stationary member of the tape recorder. One arm 30a of the lever 30 extends to a position which is located below the tape hub 12 when the cassette is loaded in place, and rotatably carries a hub shaft 34 on its terminal end. The lever 30 has its other arm 30b extending over a slide plate 33 and which is formed with a projecting edge 32 laterally on its terminal end. Normally the lever 30 is urged to rotate clockwise about the pivot 31 by means of a coiled spring 37 which is disposed between the arm 30a and a stop pin 36 so as to locate the tape hub 12 which engages the hub shaft 34 toward a position offset toward the upward direction, as viewed in FIG. 8, then the central position within the associated aperture 11a.

The slide plate 33 provides support for an operating mechanism of the tape recorder including magnetic head 38 and pinch roller 39 and the like. The pinch roller 39 is rotatably carried by the end of a support arm 40 which is pivotally mounted at 41 on the slide plate 33. The support arm 40 is urged clockwise about the pivot 41 by a torsion spring 42, but its rocking motion is prevented by abutment against a stop in 43, so that it bears against a capstan 44 with the tape 16 interposed therebetween.

Along its lateral sides, the slide plate 33 is provided with pairs of elongated guide slots 33a, 33b, 33c and 33d slidably engaged by studs 45a, 45b, 45c and 45d, respectively, which are mounted on a stationary member of the tape recorder. As the slide plate 33 is moved in a direction indicated by an arrow a so that the magnetic head 38 and the pinch roller 39 bear against the magnetic tape 16 within the cassette 11 as shown in FIG. 8, the tape recorder is in its operational condition. On the other hand, when the slide plate 33 is moved in a direction indicated by an arrow b as shown in FIG. 9 so that the magnetic head 38 and the pinch roller 39 are removed from the tape 16, the operating mechanism is returned to its inoperative position.

A mechanism for retaining the slide plate 33 in its operative and inoperative positions comprises a pair of links 46, 47 and a pair of return coil springs 48a, 48b. Specifically, the coil springs 48a and 48b are tension springs which extend between pins 50a, 50b fixedly mounted on the slide plate 33 and the studs 45b, 45d, respectively, urging the slide plate 33 to move in the direction indicated by the arrow b. The links 46, 47 comprising a linkage are pivotally connected at their adjacent ends by a pin 49 so as to assume a linearly aligned position along the direction of sliding movement of the slide plate 33. At its other end, the link 46 is rockably mounted at 52 on the slide plate 33, while the link 47 is rockably mounted by a pivot 51 which is fixedly mounted on a stationary member and extends through a rectangular opening 33e in the slide plate 33. The connecting pin or pivot 49 extends above the plane of the links, and engages the projecting edge 32 of the detection lever 30 when the slide plate 33 has moved in the direction of the arrow a to cause the tape recorder to assume its operational position. At this time, the links 46, 47 assume an aligned position as shown in FIG. 8 by virtue of the resilience of a torsion spring 53 which is disposed on the pivot 51 and which normally rotates the link 47 counterclockwise. The slide plate 33 is movable in the direction of the arrow a until the links 46, 47 are aligned, whereupon it comes to a stop. It is to be noted that the resilience of the spring 53 has a magnitude which is less than that of the return springs 48a, 48b.

In operation, in the operational position shown in FIG. 8, as a tape winding operation has proceeded to the end of the tape 16, the tape hub 12 is caused to be displaced in the downward direction, as viewed in FIG. 8, within its aperture 11a in the same manner as in the previous embodiment. As the displaced, the hub shaft 34 also displaces therewith, so that the detection lever 30 is rocked counterclockwise about its pivot 31 against the resilience of the spring 37 until its arm 30a abuts against a stop pin 54. In this manner, the tape end is detected, and the rocking motion of the detection lever 30 causes the projecting edge 32 at the end of its other arm 30b to push the pin 49 to the right, as viewed in FIG. 8. Thereupon, the links 46 and 47 are rocked counterclockwise about the pivot 52 and clockwise about the pivot 51, respectively, beyond the dead center thereof, whereby the resilience of the return springs 48a, 48b becomes effective to cause a sliding movement of the slide plate 33 in the direction of the arrow b, as shown in FIG. 9, returning the operating mechanism to its inoperative position. When the slide plate 33 is returned to its original position, the magnetic head 38 and the pinch roller 39 are removed from the tape, and additionally a manual operating button or buttons and/or driving parts are returned to their original positions to stop the tape recorder automatically.

In the stop position of the tape recorder, tension is no longer maintained in the tape, so that the detection lever 30 is rocked clockwise under the action of the spring 37, returning to its initial position. However, the resilience of the spring 53 is insufficient to return the links 46, 47 to their dead center position (see FIG. 8) in which the links are aligned, unless the slide plate 33 is moved. This is because the resilience of the spring 53 is reduced as compared with that of the return springs 48a, 48b.

While in the above described embodiments, a displacement of the supply hub shafts 24, 34 has been utilized to rock the detection levers 20, 30, it should be apparent that the take-up hub shafts 25, 35 can alternatively be displaced within the fitting opening 11b of the tape hub 13 in order to apply a rocking motion to the detection levers 20, 30. When a tape winding operation has proceeded to either end of the tape, the winding effort of the driving shaft produces a force to displace both tape hubs associated with the supply or take-up hub shafts, so that it is only necessary that at least one of these hub shafts be displaceable in its associated fitting opening of the corresponding tape hub.

What is claimed is:

1. A tape cassette for use in a tape recorder having a pair of hub supporting shafts extending upwardly from a cassette mounting plate, said tape cassette comprising a cassette containing at least one guide roller; a pair of tape hubs rotatably disposed within the cassette at positions which are offset at opposite sides from the center thereof; a magnetic tape having its opposite ends secured to the pair of hubs, the tape extending from one of the hubs and around the guide roller before being taken up on the other hub; said cassette comprising front and rear walls joined by a pair of long sides and a pair of short sides defining a substantially hollow housing and having first and second pairs of aligned apertures formed in the walls of the cassette wherein each pair of apertures receives and rotatably supports an associated one of the tape hubs, all of the apertures being in the form of an elliptically elongated slot having its major axis substantially parallel to the short sides of the cassette; said hubs being hollow cylindrical shaped members having their opposite ends provided with ribs respectively extending into associated ones of the pairs of openings and thereby adapted to experience more movement in the direction of said major axis than in the direction perpendicular thereto; the hubs and the pairs of openings enabling rotation of the hubs to be viewed from either wall of the cassette and enabling the hubs to receive the drive shafts through either wall of the cassette, said hubs being free to move in either direction from the center of the elongated slots and along the associated major axes to align the hubs with the drive shafts as the cassette is lowered upon the drive shafts at an angle to said mounting plate, and being adapted to return to the centers of the elongated slots once the drive shafts are fully inserted into the hubs and the cassette is substantially parallel to said mounting plate.

2. A tape cassette according to claim 1 in which each of the tape hubs is formed with a pair of annular ribs on both upper and lower surfaces for loosely fitting within the apertures, at least the end faces of the ribs being visually accessible from the exterior; the interiors of said hubs having projection means adapted to engage cooperating projections provided on the tape recorder shafts.

3. A tape cassette according to claim 1 which the perimeter of each tape hub on which the magnetic tape is wound has a diameter which is less than the length of the aperture as measured along the major axis and which is greater than the length of the aperture as measured along the minor axis.

4. An automatic stopping device of a cassette tape recorder comprising a tape cassette having a pair of apertures formed therein for receiving a pair of tape hubs, at least one of the apertures being in the form of a substantially elliptically elongated slot having its major axis disposed substantially parallel to one side of the cassette; a detection mechanism for detecting the end of a tape winding operation when a tape winding operation has proceeded to either end of a magnetic tape contained within the tape cassette, the detection mechanism including a tape drive shaft for engagement with one of the tape hubs to exert a winding effort thereon, the detection mechanism detecting an end of a tape winding operation in response to a displacement of the tape hub within its associated aperture which occurs as a result of tension maintained in the tape at the end of such winding operation; and an automatic stopping mechanism associated with the detection mechanism for returning an operating mechanism of the tape recorder to its inoperative position.

5. An automatic stopping device of a cassette tape recorder according to claim 4 in which the detection mechanism comprises a detection lever carrying a detector at its one end and carrying the tape drive shaft at its other end, the detection lever being pivotally mounted so that the tape drive shaft is rockable in the direction of the major axis of the aperture.

6. An automatic stopping device of a cassette tape recorder according to claim 5 in which the detector comprises a pin operating on a switch.

7. An automatic stopping device of a cassette tape recorder according to claim 5 in which the detector comprises a member which operates on a linkage.

8. An automatic stopping device of a cassette tape recorder according to claim 4 in which the automatic stopping mechanism comprises a linkage and return spring means which controls a slide plate carrying a magnetic head and a pinch roller between an operative position and an inoperative position.

9. An automatic tape detection device of a cassette tape recorder comprising a tape cassette having a pair of apertures formed therein for receiving a pair of tape hubs, at least one of the apertures being in the form of a substantially elliptically elongated slot having its major axis disposed substantially parallel to one side of the cassette; a detection mechanism for detecting the end of a tape winding operation when a tape winding operation has proceeded to either end of a magnetic tape contained within the tape cassette, the detection mechanism including a tape drive shaft for engagement with one of the tape hubs to exert a winding effort thereon, the detection mechanism detecting an end of a tape winding operation in response to a displacement of the other tape hub within its associated elongated aperture which occurs as a result of tension imposed upon the tape at the end of such winding operation;
the detection device further including an electrical circuit having at least a power source and a switch which normally disconnects the power source in said circuit, said switch having an operating member;
a detection lever responsive to displacement of said other tape hub to activate said switch operating member to complete said circuit;
a tape end detection indicator coupled in said electrical circuit and energized upon completion thereof to provide a tape end detection indication.

10. The device of claim 9 wherein said tape end detection indicator is a visually observable indicating means.

11. The device of claim 9 wherein said tape end detection indicator comprises means for generating an audible alarm.

12. The device of claim 9 wherein said tape end detection indicator comprises first means for creating a visually observable alarm and second means for generating an audible alarm.

13. An automatic tape detection device of a cassette tape recorder comprising a tape cassette having a pair of apertures formed therein for receiving a pair of tape hubs, at least one of the apertures being in the form of a substantially elliptically elongated slot having its major axis disposed substantially parallel to one side of the cassette; a detection mechanism for detecting the end of a tape winding operation when a tape winding operation has proceeded to either end of a magnetic tape contained within the tape cassette, the detection mechanism including a tape drive shaft for engagement with one of the tape hubs to exert a winding effort thereon, the detection mechanism detecting an end of a tape winding operation in response to a displacement of the other tape hub within its associated elongated aperture which occurs as a result of tension imposed upon the tape at the end of such winding operation; the detection device further includes an electrical circuit having at least a power source and a switch which normally disconnects the power source in said circuit, said switch having an operating member; a detection lever responsive to displacement of said other tape hub to activate said switch operating member to complete said circuit;
an electrical tape end detection stopping means coupled in said electrical circuit and energized upon completion thereof to stop the tape; and a tape end detection indicator driven by the detection mechanism for providing a visually observable indication of detection of the tape end.

14. The device of claim 13 wherein the detection device further includes an electrical circuit having at least a power source and a switch which normally disconnects the power source in said circuit, said switch having an operating member; a detection lever responsive to displacement of said other tape hub to activate said switch operating member to complete said circuit;
a tape end detection indicator coupled in said electrical circuit and energized upon completion thereof to stop the tape; a slice plate carrying a magnetic head and a pinch roller between an operative position and an inoperative position; said stopping means moving said slide plate to the inoperative position to displace the magnetic head and pinch roller from the tape.

15. The tape stopping of claim 14 wherein the electrical stopping means comprises a solenoid.

16. An automatic tape detection device of a cassette tape recorder comprising a tape cassette having a pair of apertures formed therein for receiving a pair of tape hubs, at least one of the apertures being in the form of a substantially elliptically elongated slot having its major axis disposed substantially parallel to one side of the cassette; a detection mechanism for detecting the end of a tape winding operation when a tape winding operation has proceeded to either end of a magnetic tape contained within the tape cassette, the detection mechanism including a tape drive shaft for engagement with one of the tape hubs to exert a winding effort thereon, the detection mechanism detecting an end of tape winding operation in response to a displacement of the other tape hub within its associated elongated aperture which occurs as a result of tension imposed upon the tape at the end of such winding operation; the detection device further includes an electrical circuit having at least a power source and a switch which normally disconnects the power source in said circuit, said switch having an operating member; a detection lever responsive to displacement of said other tape hub to activate said switch operating member to complete said curcuit;
an electrical tape end detection means coupled in said electrical circuit and energized upon completion thereof; and a tape end detection indicator activated by the detection mechanism for providing a visually observable indication of detection of the tape end.

17. The device of claim 16 further comprising
a movable plate; a window in the recorder housing; indicia provided on said plate being normally displaced from the field of view of the window; said stopping means, when energized, moving said plate to thereby move said indicia into view in said window.

18. The tape stopping device of claim 17 wherein the electrical means comprises a solenoid.

* * * * *